Feb. 7, 1961 E. GENNING 2,971,063

SWITCHING ARRANGEMENT FOR ELIMINATING NOISE IN A TAPE RECORDING AND REPRODUCING SYSTEM

Filed Dec. 27, 1954 2 Sheets-Sheet 1

INVENTOR:
ERNST GENNING
BY:
Michael S. Striker
agt.

Feb. 7, 1961 E. GENNING 2,971,063
SWITCHING ARRANGEMENT FOR ELIMINATING NOISE IN A TAPE RECORDING AND REPRODUCING SYSTEM
Filed Dec. 27, 1954 2 Sheets-Sheet 2

INVENTOR:
ERNST GENNING
BY:
Michael S. Striker
Agt.

United States Patent Office 2,971,063

Patented Feb. 7, 1961

2,971,063

SWITCHING ARRANGEMENT FOR ELIMINATING NOISE IN A TAPE RECORDING AND REPRODUCING SYSTEM

Ernst Genning, Fassberg, near Celle, Bez. Hannover, Germany, assignor to Protona Produktionsgesellschaft für Elektro-Akustische Geräte G.m.b.H., Hamburg, Germany Filed Dec. 27, 1954, Ser. No. 477,649

Claims priority, application Germany Dec. 28, 1953

6 Claims. (Cl. 179—100.2)

This invention relates to a circuit arrangement for an electro-acoustical sound recording and reproducing apparatus operated with a record carrier such as a tape or wire which can be provided magnetically with a sound record.

Numerous embodiments of such instruments have already been developed. They serve for recording dictation and reports and may also be ued for recording music when suitable frequencies are employed. More recently, there is a tendency for making such instruments smaller. In this connection, instruments of pocket size have already become known, which are carried outside the clothing of a person or may be concealed in the clothing. The lighter and smaller such instruments are made, the more attention must be paid to the wiring arrangements. In view of the compression into a small space of the wiring elements, and of the electrical and magnetic regenerative couplings caused thereby, it is necessary to arrange the wiring elements in such a manner that they do not interfere mutually, i.e. to decouple same. Furthermore, the instruments should be as foolproof as possible for operation by the layman, and should be operable by a single switch button.

The present invention solves this problem by the employment of a closed-circuit arrangement including connections to electrical ground, and switch means which can be operated for alternatively connecting the pick-up and recording head and the loud-speaker-microphone through a selected ground connection either with the amplifier input or with its output, respectively, for recording or reproduction, whichever is desired. The bias magnetization of the pick-up and recording head and the magnetization of the erasing head on the one hand, and preferably the loud-speaker-microphone (or a telephone pick-up, if used instead) on the other hand are simultaneously switched on or off, respectively. The commutation of the ground connections can be effected by means of only two commutation switches which are preferably operated simultaneously and jointly, the movable contacts of which are grounded. In this arrangement according to the invention, the individual elements of the closed-circuit arrangement, particularly the coupling members, the amplifier, the loud-speaker-microphone, and the switch contacts have multipurpose functions. The number of contacts is therefore very small, which enhances the safe operation of the instrument, simplifies its electrical and mechanical construction and facilitates the construction of smaller and more compact instruments. Moreover, the commutation switches have their operating stationary contacts always placed by their movable contact in connection with ground, which suppresses the spreading of electrical stray fields and the resulting feed-back effects. This facilitates and simplifies the shielding of the contacts and of the entire wiring.

In the closed-circuit arrangement according to the present invention the pick-up or recording head coil or coils are connected in series with the input and output coupling members of the amplifier and with the electro-acoustic transducer to thus form the closed circuit. The impedances of the elements which are connected in the closed-circuit should be substantially equal to one another so that upon switching from recording to reproduction, and vice versa, the electrical conditions do not change substantially. According to the invention the pick-up or recording head and the erasing head are preferably located adjacent to each other, but are magnetically decoupled with respect to each other and lodged together in a common housing to form a combined head assembly. The erasing head should, with respect to the direction of movement of the record carrier during recording, be located before the pick-up or recording head. This has the advantage that a second recording can never be, inadvertently, superimposed on an already existing recording on the carrier, since before each new recording anything that might still be recorded on the wire or tape is erased.

A telephone pick-up can be connected in parallel with the loud-speaker-microphone. Telephone pick-up attachments as such are known. They consist of an induction coil of high leakage, which, when located close to a telephone receiver can pick up a telephone conversation and transmit same to the amplifier of the magnetic sound recorder. The telephone pick-up and the loud speaker-microphone can be connected at will in the closed-circuit by means of a switch device common to both. With this common switch device it is also possible to adjust the output volume of the loud speaker or its sensitivity when used as a microphone.

The accompanying drawings show an embodiment of the circuit arrangement according to the invention. In the drawings, the connections for recording are shown in full, and those for reproduction in dotted lines.

Figures 1, 2:
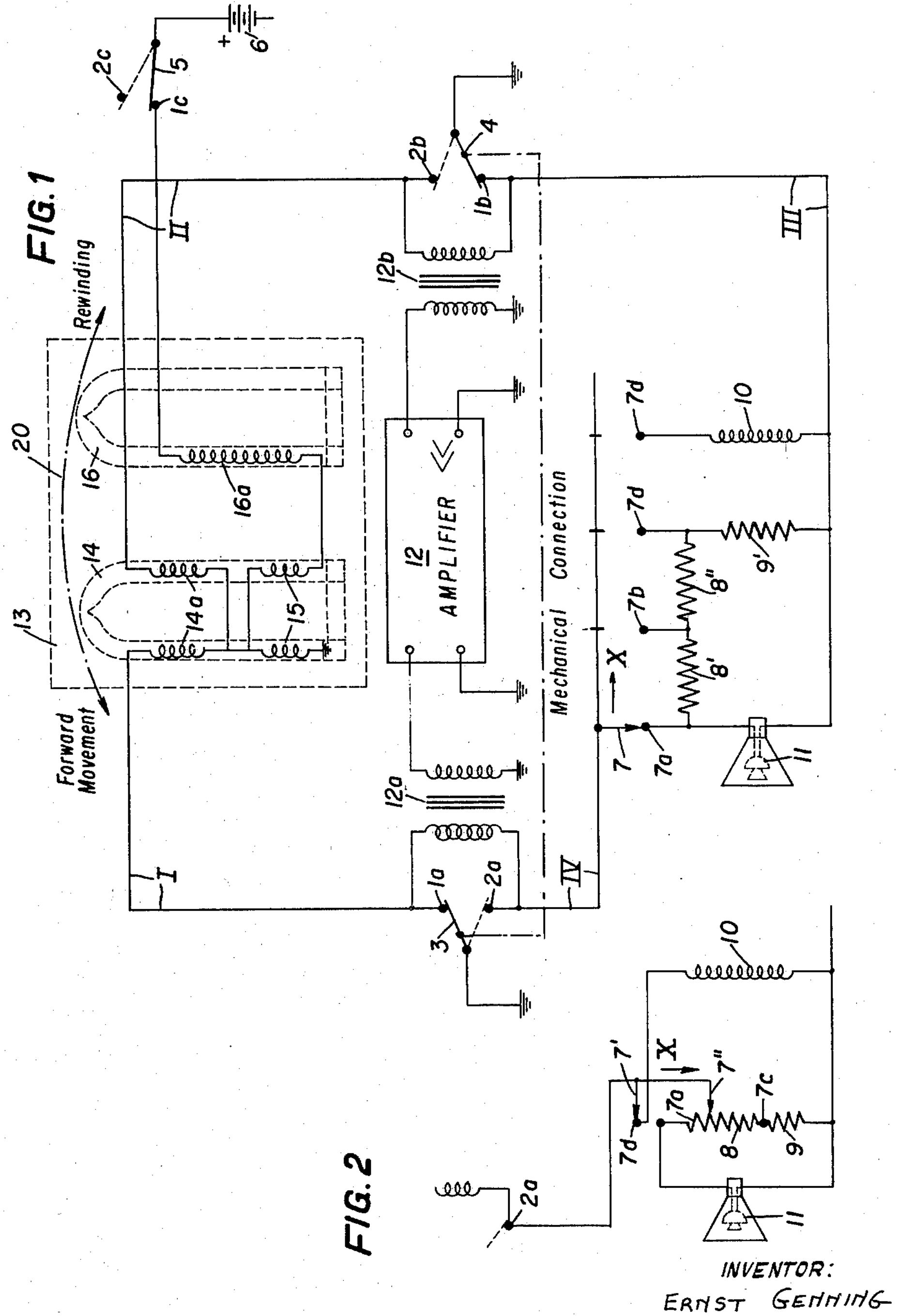
Fig. 1 shows the entire circuit arrangement.
Fig. 2 shows a portion of the circuit with modified means for adjusting the sensitivity.

In the illustrated example, the closed-circuit arrangement is formed as a four-node circuit, by connecting the circuit portions I and II with the pick-up and recording coil or coils 14a in one nodal point, and by connecting the further circuit portions III, IV with the loud speaker-microphone 11 and the telephone pick-up coil 10 in the second nodal point, and the commutation switch 3 as well as the input coupling member 12a for the amplifier 12 as third nodal point between the circuit portions I and IV and finally the switch 4 as well as the output coupling member 12b of the amplifier 12 as fourth nodal point between the circuit portions II and III, so that the amplifier 12 is connected diagonally between the two last mentioned nodal points by means of the coupling members 12a and 12b as input and output means thereof.

The pick-up and recording coils 14a are mounted in the pick-up and recording head 14 which also carries the bias magnetization winding 15. In the housing 13 of the pick-up and recording head 14 there is also contained, magnetically decoupled from the latter, the erasing head 16 with the erasing coil 16a. The erasing coil 16a is controlled by switch 5 via the stationary contact 1c, for example from the positive pole of a battery 6. This, however, applies only to recording. For reproducing operation, the switch 5 is moved to the position 2c and the erasing coil 16a remains unenergized.

The microphone-loudspeaker 11 and the telephone pick-up coil 10 can be switched on whenever desired by the commutation switch contact 7 slidable in direction of arrow X, to be a nodal point between the circuit portions III and IV. Sensitivity and frequency of the loudspeaker microphone 11 are adjustable gradually by moving the contact 7 between the switch positions 7a, 7b, 7c, respectively associated with resistors 8′, 8″, 9′. In the switch position 7d the loud speaker-microphone 11 is switched off, and the telephone pick-up coil 10 is switched on.

The telephone pick-up attachment consists essentially of a coil 10 having an impedance with a great leakage factor which may be placed in the vicinity of a telephone receiver (not shown), whereby it is coupled with the telephone receiver inductively, without direct connection. Thus, it is only necessary to place the microphone housing which may also contain the coil 10 in the vicinity of the telephone apparatus.

The diagonal branch of the network is formed by a miniature amplifier 12, for example an amplifier with subminiature valves. The output and input terminals of the amplifier are coupled by corresponding coupling members 12a and 12b with the right and left nodal points, respectively, of the ring circuit, as shown in Fig. 1. The two primary terminals 1a and 2a of the input coupling member 12a can be grounded as required through the commutation switch 3, and likewise the secondary terminals 1b and 2b of the output coupling member 12b may be grounded by the commutation switch 4. The commutation switches 3 and 4 may be coupled mechanically for being operated together, i.e. by means of one common switch knob.

The sound carrier 20 is indicated in the diagram by a dash-dotted line. When advancing, the sound carrier 20 first passes the erasing head 16 and then the pick-up and recording head 14; in the reverse movement it first passes the head 14 and then the head 16.

For recording, commutation switches 3 and 4, and also the switches 5 and 7 which are preferably mechanically coupled therewith are brought into their first position associated with recording and shown in full lines, and the sensitivity of the microphone-speaker 11 is regulated by means of 7 by moving the latter between positions 7a, 7b, 7c. The sound carrier 20 now first passes the erasing head 16 when moved by conventional means, not shown, in forward direction. The erasing coil 16a is energized via the contact 1c and erases any recording that might still be on the sound carrier 20. When passing the head 14, the sound carrier 20 is magnetized according to the sounds received by the microphone-speaker 11. Thereby the microphone output voltage is transmitted by the input coupling member 12a to the amplifier 12, is there amplified, and is transmitted, after amplification via the output coupling member 12b to the coils 14a.

For reproduction the commutation switches 3 and 4 as well as the switches 5 and 7 are moved into their second position shown in dotted lines. Thereby the erasing coil 16a is switched off. The voltage induced in the coils 14a is transmitted via the input coupling member 12a to the amplifier 12 and delivered, after amplification, via the output coupling member 12b to the microphone-speaker 11, which is now used as a loudspeaker. The loudness and frequency response can, then, be adjusted by moving the contact 7 into a suitable one of the positions 7a, 7b, 7c.

If it is desired to record a telephone conversation, the instrument is switched for recording as stated above and the switch contact 7 is moved into position 7d so as to place the coil 10 in circuit. At the same time, of course, the microphone-speaker housing containing the telephone pick-up coil 10 is placed near to the telephone receiver (not shown).

Fig. 2 illustrates a modification of a portion of the general circuit illustrated in Fig. 1. In this case the sensitivity adjustment and switching arrangement at the bottom of the diagram of Fig. 1 is modified in such a manner that the sensitivity of the loudspeaker-microphone can be adjusted gradually instead of in three definite steps corresponding to the positions 7a, 7b, 7c of the switch 7 associated with the fixed resistors 8′, 8″ and 9′, respectively. Therefore the two resistors 8a and 8b are replaced in Fig. 2 by a potentiometer 8 which is provided with a movable tap 7″ movable in the direction of arrow X between the positions 7a and 7c. The pick-up coil 10 is connected with a fixed contact point corresponding to the position 7d and can be placed in circuit whenever desired by operation of the movable contact 7′. It can be seen that the two movable contacts 7′ and 7″ are the counterpart of the movable contact 7 in Fig. 1.

Figure 3:
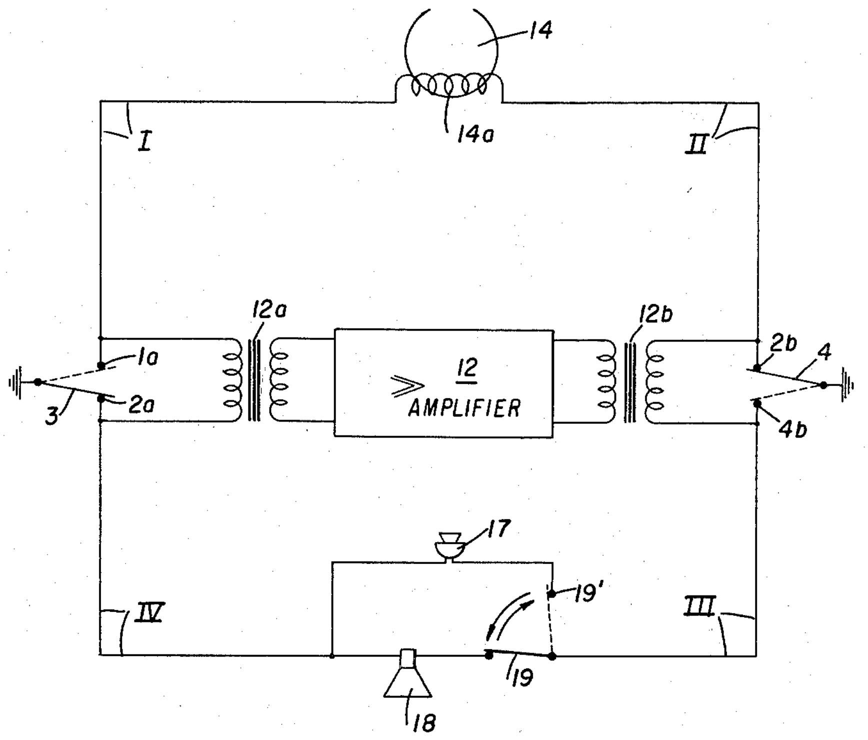
Fig. 3 shows the closed-circuit arrangement for recording with a microphone and for reproducing with a separate loud speaker, with controls set for carrying out either recording or reproduction.

The wiring arrangement according to Fig. 3 is substantially the same as that of Fig. 1 (the erasing head circuit and the means for sensitivity adjustment and for telephone pick-up connection being omitted) except for the fact that a separate microphone 17 and a loudspeaker 18 are provided which may be put in circuit as required by operation of the change-over switch 19 as shown. This switch may be coupled with switches 3 and 4 for simultaneous operation for either recording or reproduction. In this embodiment the amplifier input and output means are not grounded, but the ends of the circuit containing the coil 14a are grounded as in Fig. 1 through the switches 3 and 4.

What I claim is:

1. In a magnetic recording and reproducing apparatus, in combination, a magnetizable record carrier adapted to be moved along a predetermined path; a recording and reproducing head arranged adjacent said predetermined path and having at least one magnetic winding; means for premagnetizing said head, whenever desired; an electromagnetic transducer for converting sound waves into electrical impulses and vice versa connected in circuit with said magnetic winding of said recording and reproducing head; a single amplifier means for recording and reproducing operation and having a pair of input terminals and a pair of output terminals connected in circuit between said transducer and said recording and reproducing head, one of said input terminals being connected to one side of said magnetic winding and the other of said input terminals being connected to one side of said transducer, one of said output terminals being connected to the other side of said transducer and the other of said output terminals bein gconnected to the other side of said magnetic winding; and switching means for simultaneously electrically grounding said one input and output terminals of said amplifier means for placing the apparatus in recording condition and, alternatively, for simultaneously electrically grounding said other input and output terminals thereof for placing the apparatus in reproducing condition.

2. In a magnetic recording and reproducing apparatus, in combination, a magnetizable record carrier adapted to be moved along a predetermined path; a recording and reproducing head arranged adjacent said predetermined path and having at least one magnetic winding; an erasing head connected adjacent said predetermined path for erasing any magnetized portions of said record carrier, when the apparatus is in recording condition and before said magnetized portions reach said recording and reproducing head; means for premagnetizing said head whenever desired; an electromagnetic transducer for converting sound waves into electrical impulses and vice versa connected in circuit with said magnetic winding of said recording and reproducing head; a single amplifier means for recording and reproducing operation and having a pair of input terminals and a pair of output terminals connected in circuit between said transducer and said recording and reproducing head, one of said input terminals being connected to one side of said magnetic winding and the other of said input terminals being connected to one side of said transducer, one of said output terminals being connected to the other side of said transducer and the other of said output terminals being connected to the other side of said magnetic winding; and switching means for simultaneously electrically grounding said one input and output terminals of said amplifier means for placing the apparatus in recording condition and, alternatively, simultaneously electrically grounding said other input and output terminals thereof for placing the apparatus in reproducing condition.

3. In a magnetic recording and reproducing apparatus, in combination, a magnetizable record carrier adapted to be move dalong a predetermined path; a recording and reproducing head arranged adjacent said predetermined path and having at least one magnetic winding; means for premagnetizing said head, whenever desired; an electric-magnetic transducer for converting sound waves into electrical impulses and vice versa connected in circuit with said magnetic winding of said recording and reproducing head; a single amplifier means for recording and reproducing operation and having a pair of input terminals and a pair of output terminals connected in circuit between said transducer and said recording and reproducing head, one of said input terminals being connected to one side of said magnetic winding and the other of said input terminals being connected to one side of said transducer, one of said output terminals being connected to the other side of said transducer and the other of said output terminals being connected to the other side of said magnetic winding; first switching means having a pair of fixed contacts and an electrically grounded movable contact, said first switching means being movable between a recording position wherein said movable contact thereof is electrically connected to one of said fixed contacts and a reproducing position wherein said movable contact is electrically connected to the other one of said fixed contacts, said one fixed contact being electrically connected to said one input terminal and the other of said fixed contacts being connected to the other input terminal; and a second switching means having a pair of fixed contacts and an electrically grounded movable contact, said second switching means being movable between a recording position wherein said movable contact thereof is electrically connected to one of its fixed contacts and a reproducing position wherein said movable contact is electrically connected to the other one of its fixed contacts, said one fixed contact of said second switching means being connected to said one output terminal and the other fixed contact of said second switching means being connected to said other output terminal of said amplifier means whereby with said first and second switching means in recording or reproducing position, respectively, the apparatus is set for recording or reproducing operation, respectively.

4. In a magnetic recording and reproducing apparatus, in combination, a magnetizable record carrier adapted to be moved along a predetermined path; a recording and reproducing head arranged adjacent said predetermined path and having at least one magnetic winding; an erasing head connected adjacent said predetermined path for erasing any magnetized portions of said record carrier, when the apparatus is in recording condition and before said magnetized portions reach said recording and reproducing head; means for premagnetizing said head, whenever desired; an electromagnetic transducer for converting sound waves into electrical impulses and vice versa connected in circuit with said magnetic winding of said recording and reproducing head; a single amplifier means for recording and reproducing operation and having a pair of input terminals and a pair of output terminals connected in circuit between said transducer and said recording and reproducing head, one of said input terminals being connected to one side of said magnetic winding and the other of said input terminals being connected to one side of said transducer, one of said output terminals being connected to the other side of said transducer and the other of said output terminals being connected to the other side of said magnetic winding; first switching means having a pair of fixed contacts and an electrically grounded movable contact, said first switching means being movable between a recording position wherein said movable contact thereof is electrically connected to one of said fixed contacts and a reproducing position wherein said movable contact is electrically connected to the other of said fixed contacts, said one fixed contact being electrically connected to said one input terminal and the other of said fixed contacts being connected to the other input terminal; and a second switching means having a pair of fixed contacts and an electrically grounded movable contact, said second switching means being movable between a recording position wherein said movable contact thereof is electrically connected to one of its fixed contacts and a reproducing position wherein said movable contact is electrically connected to the other of its fixed contacts, said one fixed contact of said second switching means being connected to said one output terminal and the other fixed contact of said second switching means being connected to said other output terminal of said amplifier means whereby with said first and second switching means in recording or reproducing position, respectively, the apparatus is set for recording or reproducing operation, respectively.

5. Apparatus as claimed in claim 1 wherein an induction coil is adapted to be connected in parallel with said transducer; and additional switching means for connecting said induction coil in place of said transducer, whenever desired.

6. Apparatus as claimed in claim 3 wherein the movable contacts of said first and second switching means are mechanically coupled together so that the same may be simultaneously moved between their respective recording and reproducing positions.

References Cited in the file of this patent

UNITED STATES PATENTS

| | | |
|---|---|---|
| 2,538,892 | Begun | Jan. 23, 1951 |
| 2,567,582 | Spears | Sept. 11, 1951 |
| 2,609,457 | Thurm | Sept. 2, 1952 |
| 2,616,982 | Gray | Nov. 4, 1952 |
| 2,654,003 | Dashiell | Sept. 29, 1953 |
| 2,677,727 | Haynes | May 4, 1954 |
| 2,713,618 | McNabb | July 19, 1955 |

OTHER REFERENCES

Elements of Sound Recording, by John G. Frayne et al., 1949 edition, pages 583–585.